United States Patent
Harrenstien et al.

(10) Patent No.: US 8,645,134 B1
(45) Date of Patent: Feb. 4, 2014

(54) GENERATION OF TIMED TEXT USING SPEECH-TO-TEXT TECHNOLOGY AND APPLICATIONS THEREOF

(75) Inventors: Kenneth Harrenstien, Palo Alto, CA (US); Toliver Jue, Tokyo (JP); Christopher Alberti, New York, NY (US); Naomi D. Black-Bilodeau, El Cerrito, CA (US)

(73) Assignee: Google Inc., Mountain View, CA (US)

( * ) Notice: Subject to any disclaimer, the term of this patent is extended or adjusted under 35 U.S.C. 154(b) by 464 days.

(21) Appl. No.: 12/949,527

(22) Filed: Nov. 18, 2010

Related U.S. Application Data (60) Provisional application No. 61/262,426, filed on Nov. 18, 2009.

(51) Int. Cl.
*G10L 15/26* (2006.01)
(52) U.S. Cl.
USPC .......................................................... 704/235
(58) Field of Classification Search
USPC .......................................................... 704/235
See application file for complete search history.

(56) References Cited

U.S. PATENT DOCUMENTS

| | | | |
|---|---|---|---|
| 7,624,014 B2 * | 11/2009 | Stewart et al. | 704/251 |
| 8,041,716 B2 * | 10/2011 | Daigle et al. | 707/728 |
| 8,204,891 B2 * | 6/2012 | Thompson et al. | 707/749 |
| 2002/0161579 A1 * | 10/2002 | Saindon et al. | 704/235 |
| 2004/0049385 A1 * | 3/2004 | Lovance et al. | 704/235 |
| 2004/0080528 A1 * | 4/2004 | Rand et al. | 345/738 |
| 2005/0042591 A1 * | 2/2005 | Bloom et al. | 434/307 A |
| 2007/0188599 A1 * | 8/2007 | Kenoyer | 348/14.08 |
| 2008/0097970 A1 * | 4/2008 | Olstad et al. | 707/3 |
| 2008/0284910 A1 * | 11/2008 | Erskine et al. | 348/468 |
| 2009/0063279 A1 * | 3/2009 | Ives et al. | 705/14 |

* cited by examiner

*Primary Examiner* — Jakieda Jackson
(74) *Attorney, Agent, or Firm* — Lowenstein Sandler LLP (57) ABSTRACT

Embodiments relate to generation of timed text in web video. In an embodiment, a computer-implemented method generates timed text for online video. In the method, a request to play a timed text track of a video incorporated into a web video service is received from a client computing device. Prior to receipt of the request, audio of the video is processed to determine intermediate timed text data. The intermediate timed text data lacks a complete text transcription of the audio, but includes data to enable the complete text transcription to be generated when playing the video. In response to receipt of the request, a text transcription of the audio is determined using the intermediate data with an automated speech-to-text algorithm. Finally, the text transcription of the audio is sent to the client computing device for display along with the video.

20 Claims, 10 Drawing Sheets

YouTube™
Broadcast Yourself™   Home  Videos  Channels  Shows

GoogleDevelopers▼   ✉(204)  Sign Out
Subscriptions   History   [Upload]

[Search]

My Account▼ / Captions and Subtitles

Info & Settings | AudioSwap | Annotations | Captions and Subtitles

This is the title of the video

— 502

0:00/1:35

— 802

Track Name: English

| Start | End | Caption Text |
|---|---|---|
| 0:00:00.534 | 0:00:01.400 | Hi, I'm Mendel. |
| 0:00:01.400 | 0:00:03.801 | Product Marketing Manager for Google Friend Connect. |
| 0:00:03.801 | 0:00:05.067 | With Google Friend Connect, |
| 0:00:05.067 | 0:00:07.834 | you can easily add social features to your site. |
| 0:00:07.834 | 0:00:10.133 | This means your visitors can engage more deeply |
| 0:00:10.133 | 0:00:12.667 | with your content and with each other. |
| 0:00:12.667 | 0:00:14.534 | Once you start using Google Friend Connect, |
| 0:00:14.534 | 0:00:17.400 | your visitors will be able to join your site. |
| 0:00:17.400 | 0:00:18.501 | Instead of having to create |
| 0:00:18.501 | 0:00:20.167 | a new account with a new password. |

Return to Available Tracks   [Settings] [Download]   [Remove]

Lorem ipsum dolor sit amet, consectetur adipisicing elit, sed do eiusmod tempor incididunt ut labore et dolore magna aliqua. enim ad minim veniam, quis nostrud exercitation ullamco laboris nisi ut aliquip ex ea commodo consequat. Duis aute irure dolor in reprehenderit in voluptate velit esse cillum ut labore et dolore magna aliqua

GENERATION OF TIMED TEXT USING SPEECH-TO-TEXT TECHNOLOGY AND APPLICATIONS THEREOF

This is application claims benefit under 35 U.S.C. §119(e) to U.S. Provisional Application No. 61/262,426 filed Nov. 18, 2009, which is incorporated by reference herein in its entirety.

BACKGROUND

1. Field of the Invention

The present field generally relates to captioning web video.

2. Background Art

Video is increasingly being accessed by remote users over networks using web video services, such as the YOUTUBE service made available by Google Inc. The rise of the World Wide Web, including various web applications, protocols, and related networking and computing technologies has made it possible for remote users to view and to play video.

Timed text, such as caption or subtitles, is sometimes provided with video content and is "timed" so that certain text appears in association with certain portions of a video content. Timed text can serve a number of purposes. First, timed text can make the dialogue understandable to the hearing impaired. Second, timed text can make the video understandable in environments where audio is unavailable or not permitted. Third, timed text can provide commentary to video with educational or entertainment value. Finally, timed text can translate the audio for those who do not understand the language of the dialogue. However, manual transcription of timed text can be expensive and time-consuming.

BRIEF SUMMARY

Embodiments relate to generation of timed text in web video. In a first embodiment, a computer-implemented method generates timed text for online video. In the method, a request to play a timed text track of a video incorporated into a web video service is received from a client computing device. Prior to receipt of the request, audio of the video is processed to determine intermediate timed text data. The intermediate timed text data lacks a complete text transcription of the audio, but includes data to enable the complete text transcription to be generated when playing the video. In response to receipt of the request, a text transcription of the audio is determined using the intermediate data. Finally, the text transcription of the audio is sent to the client computing device for display along with the video.

In a second embodiment, a system generates timed text for online video. The system includes a timed text player module that receives, from a client computing device, a request to play a video incorporated into a web video service. Prior to receipt of the request by the timed text player, a preprocessor module processes audio of the video to determine intermediate timed text data. The intermediate timed text data lacks a complete text transcription of the audio, but includes sufficient data to enable the complete text transcription to be generated when playing the video. In response to the request by the timed text player, a text generator module determines a text transcription of the audio using the intermediate data. Finally, the timed text player module sends the text transcription of the audio to the client computing device for display along with the video.

In a third embodiment, a computer-implemented method generates timed text for online video. In the method, a transcript, input by a user, to incorporate into a web video service for a video is received. A quality value of the transcript of the video is determined. The quality value represents how closely the transcript specifies audio for the video. When the transcript is of sufficient quality for alignment, a determining step determines time codes indicating when to display respective portions of the transcript to align the transcript with the audio of the video. The time codes are provided to a client computing device to display the transcript along with the video.

In a fourth embodiment, a system generates timed text for online video. The system includes a timed text module that enables a user to input a transcript to incorporate into a web video service for a video. A transcript alignment module determines a quality of the transcript of the video, the quality representing how closely the transcript specifies audio for the video. The transcript alignment module also determines, when the transcript is of sufficient quality, time codes indicating when to display respective portions of the transcript to align the transcript with the audio of the video. Finally, a timed text player module provides the time codes determined by the transcript alignment module to a client computing device to display the transcript along with the video.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Systems and methods are needed to automatically generate timed text for web video.

This description relates to generating timed text for web video using a real-time algorithm. In an embodiment, a video is preprocessed to determine intermediate data that is sufficient to generate timed text in real-time. Examples of such intermediate data are further described below. The intermediate data enables the captions to be generated in real-time, but does not include the text transcription of the video. Then, when a user requests timed text to be played with the video, a real-time recognition algorithm is used to generate a text transcription of the web video in real-time based on the intermediate data. In this way, captions may be automatically generated without having to store the text transcription. As further a benefit of generating timed text at request-time, the timed text may be translated into other languages, such as the user's language. Also, the timed text may customized in other ways. For example, the timed text may be reformatted according to as needed for the specific device. This and other embodiments are described below with reference to the accompanying drawings.

System

Figure 1:
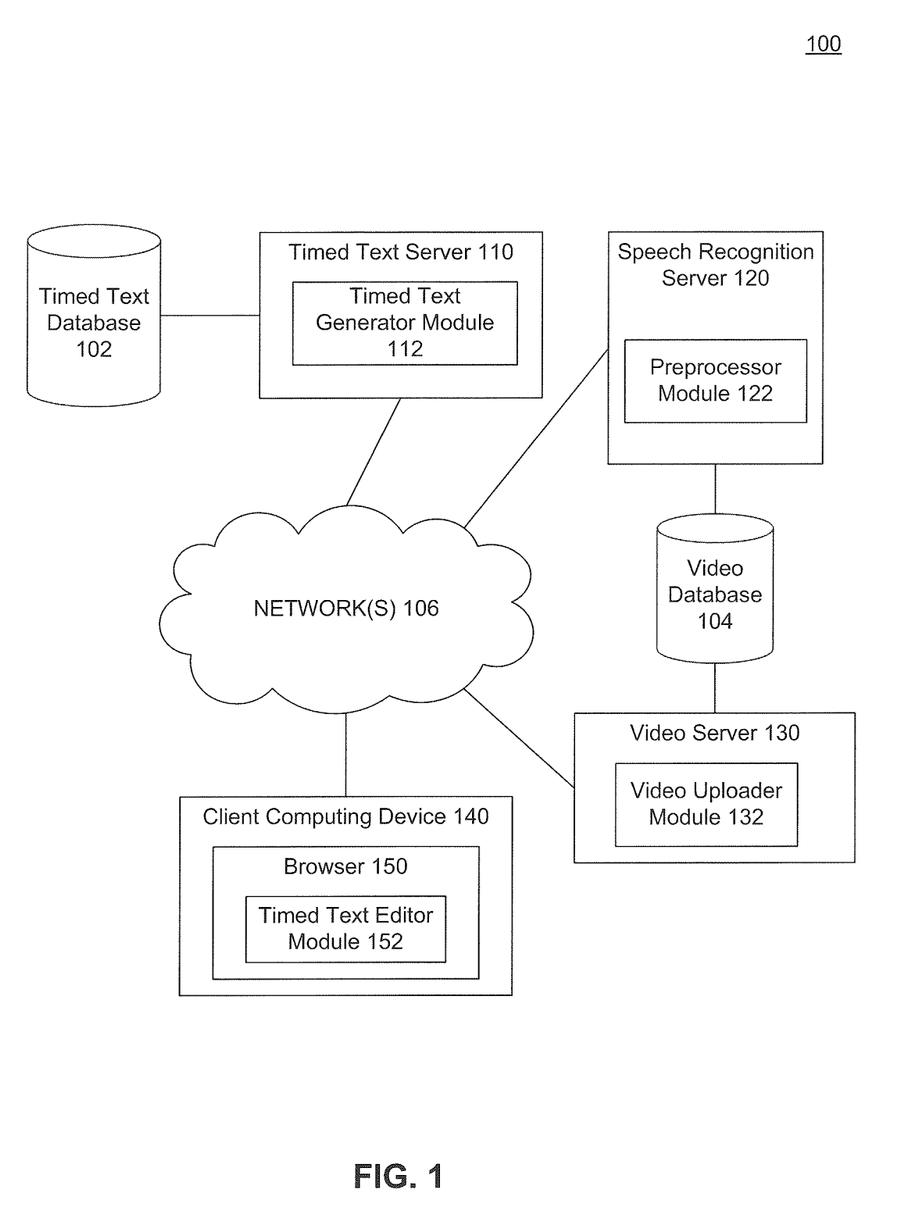
FIG. 1 is a diagram illustrating a system for generating timed text for web video according to an embodiment.

FIG. 1 is a diagram illustrating a system 100 for generating timed text for web video according to an embodiment. System 100 includes a timed text server 110, a speech recognition server 120, a video server 130, and a client computing device 140 coupled via one or more networks 106, such as the Internet, an intranet or any combination thereof. Timed text server 110 is coupled to a timed text database 102. Speech recognition server 120 and video server 130 are both coupled to video database 104.

In general, system 100 may operate as follows to upload a new video into a web video service. A user of client computing device 140 may have a video to incorporate into the web video service. Client computing device 140 may send the video to video server 130. In response to receipt of the video, video server 130 may store the video in video database 104 and conduct some in-processing on the video. Among the in-processing, video server 130 may request that timed text server 110 generate timed text data. Timed text server 110 may communicate with speech recognition server 120 to generate intermediate timed text data sufficient to generate captions in real-time, but that does not include a text transcription of the video. Timed text server 110 may store the intermediate timed text data in timed text database 102 for later use to generate the text transcription for timed text when the video is played. Each of the components and their operation are described in greater detail below.

Client computing device 140 may include a browser 150. In an embodiment, browser 150 receives an HTTP response containing a file. As an example, the file may be encoded in hypertext markup language (HTML) or FLASH file format made available by Adobe, Inc. of California. The browser may interpret the file to instantiate a timed text editor module 152.

Timed text editor module 152 enables users to upload and manage timed text tracks for their videos incorporated into the web video service. In an embodiment, timed text editor module 152 may enable a user to request that timed text data be created for a video with no existing timed text data. In a further embodiment, timed text editor module 152 may also enable users to upload new videos and create timed text tracks for the new videos. Screenshots illustrating the operation of an example timed text editor module 152 are presented in FIGS. 6-9. Timed text editor module 152 may use remote procedure calls (RPC) or HTTP requests to communicate with video server 130.

Video server 130 includes a video uploader module 132 and may host videos for a web video service. When video uploader module 132 receives a new video, video uploader module 132 may store the new video into video database 104 to incorporate the new video into the web video service. With the new video stored in video database 104, other users may request to view the video, and video server 130 may stream the video to their video player for display. In addition to storing the new video, video uploader module 132 may conduct some initial processing on the new video. In an embodiment, video uploader module 132 may invoke a timed text generator module 112 to generate timed text data for the video.

As shown in FIG. 1, timed text generator module 112 is located on timed text server 110. In this embodiment, video uploader module 132 may invoke timed text generator module 112 using a remote procedure call. In another embodiment, text generator module 112 may be located on video server 130, and uploader module 132 may call text generator module 112 with a direct function call.

In an embodiment, timed text generator module 112 may obtain the audio track of a video and package the audio track as a request to speech recognition server 120 to generate timed text data. In another embodiment, the request may include an identifier identifying a video in video database 104, instead of including the entire audio track. In that embodiment, speech recognition server 120 may retrieve the audio track from video database 104.

In response to the request from timed text generator 110, a preprocessor module 122 included within speech recognition server 120 may determine timed text data. In an embodiment, preprocessor module 122 may determine intermediate data is sufficient to generate timed text when the video is played, but does not include a text transcription of the video. In an example, intermediate data may be a partial representation of the timed text.

In an embodiment, the intermediate format generated by preprocessor module 122 may include a list of timestamped segments. Each segment may identify a portion of the audio track with, for example, a timestamp for the beginning of the portion and a timestamp for the end of the portion. Each segment may provide information about that portion of the audio track without including the transcribed words. Further, the information may be independent of the language of the speech in the audio. In an embodiment, the intermediate format may describe a portion of the audio track by identifying a type of sound included in the portion of the track. For example, the segment may have a sound type field with values that identify whether the sound in its portion is either "speech", "noise", "music", or other types of sound known to those of skill in the art. Preprocessor module 122 may identify the different types of sound and generate the intermediate data using speech recognition algorithms known to those of skill in the art. In other embodiments, the sound type field may be omitted.

A specific example of intermediate data would use a Google "protocol buffer" to marshall the binary data generated by the speech recognition process. Examples of such data would be groups of tentative words combined with timestamps to mark the time of occurrence and their duration, along with word tokens each of which can have an associated probability estimate. There may be one such token with high probability, or several of lesser probability. In the final process of converting this intermediate data to captions for the video player, the word tokens must be correctly ordered based on timestamps, selected based on their confidence levels, divided into groups to form captions of readable length and duration, translated or corrected based on natural language processing, and re-formatted according to the needs of the specific client (e.g. plain text for some, variants of XML or HTML for others).

Once the intermediate data is generated, it is stored in timed text database 102 for later use to generate the text transcription for timed text when the new video is played. As discussed in more detail below, when a user requests to play a timed text track the intermediate data may be used to generate automatically a text transcription.

Often, automated speech recognition algorithms cannot be run in real-time with streaming video, because they require too much computing resources. By determining this intermediate data prior to a request to play a timed text track, preprocessor module 122 enables text transcription to be generated in real-time when the request is made. Further, generating an intermediate format in advance, instead of the text itself, may obviate the need to store the text transcription. When text transcription is determined in real-time, the quality of the transcription may improve as the automated speech recognition algorithms improve. As further a benefit of generating timed text at request-time, the timed text may be translated into other languages, such as the user's language.

Figure 2:
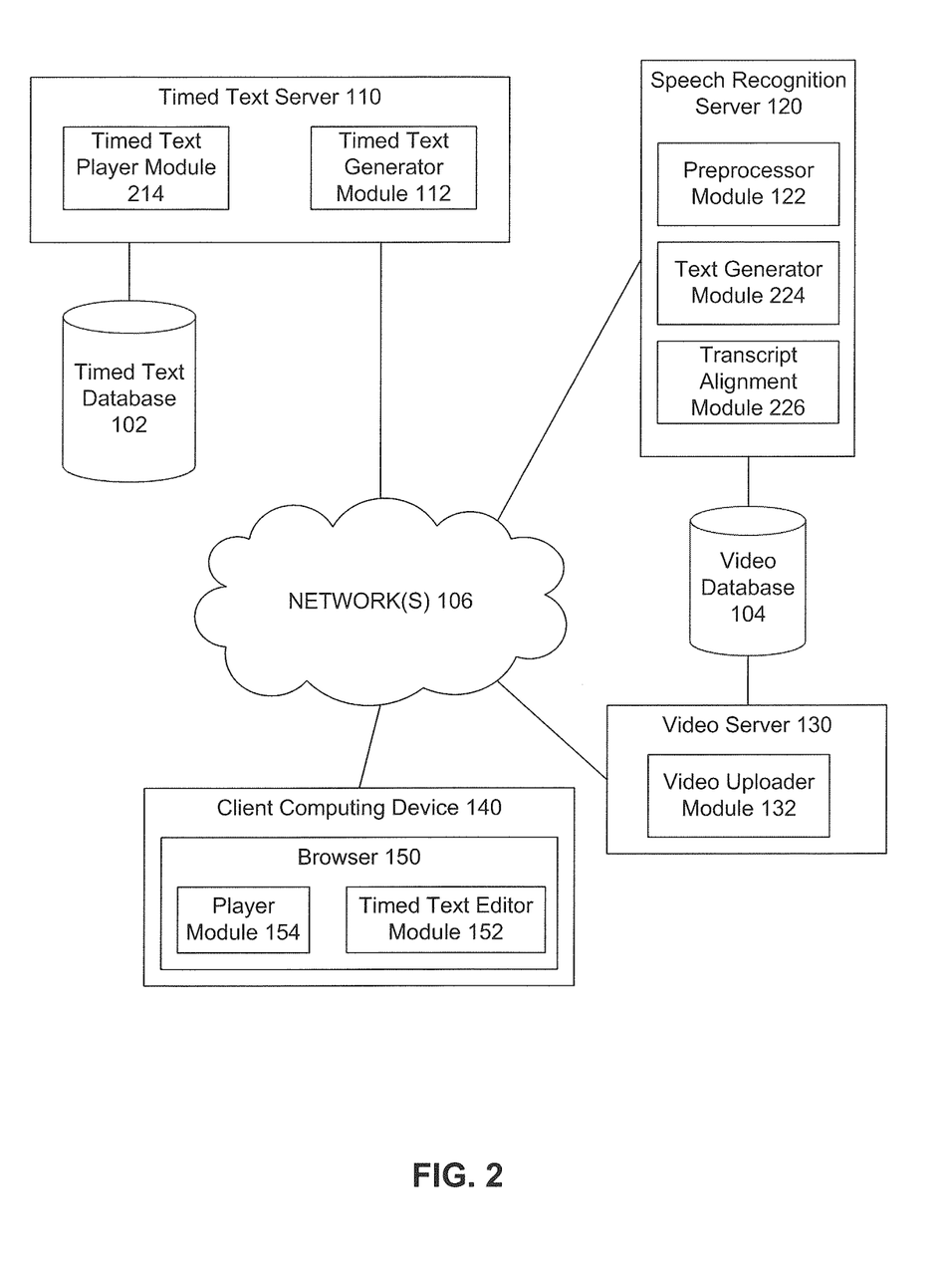
FIG. 2 is a diagram illustrating the system for generating timed text in FIG. 1 in greater detail.

FIG. 2 is a diagram illustrating system 100 for generating timed text in greater detail. In addition to the components in FIG. 1, FIG. 2 shows a timed text player module 214 included within timed text server 110; a text generator module 224 and a transcript generator module 226 included within speech recognition server 120; and a player module 154 included within browser 150.

Figure 10:
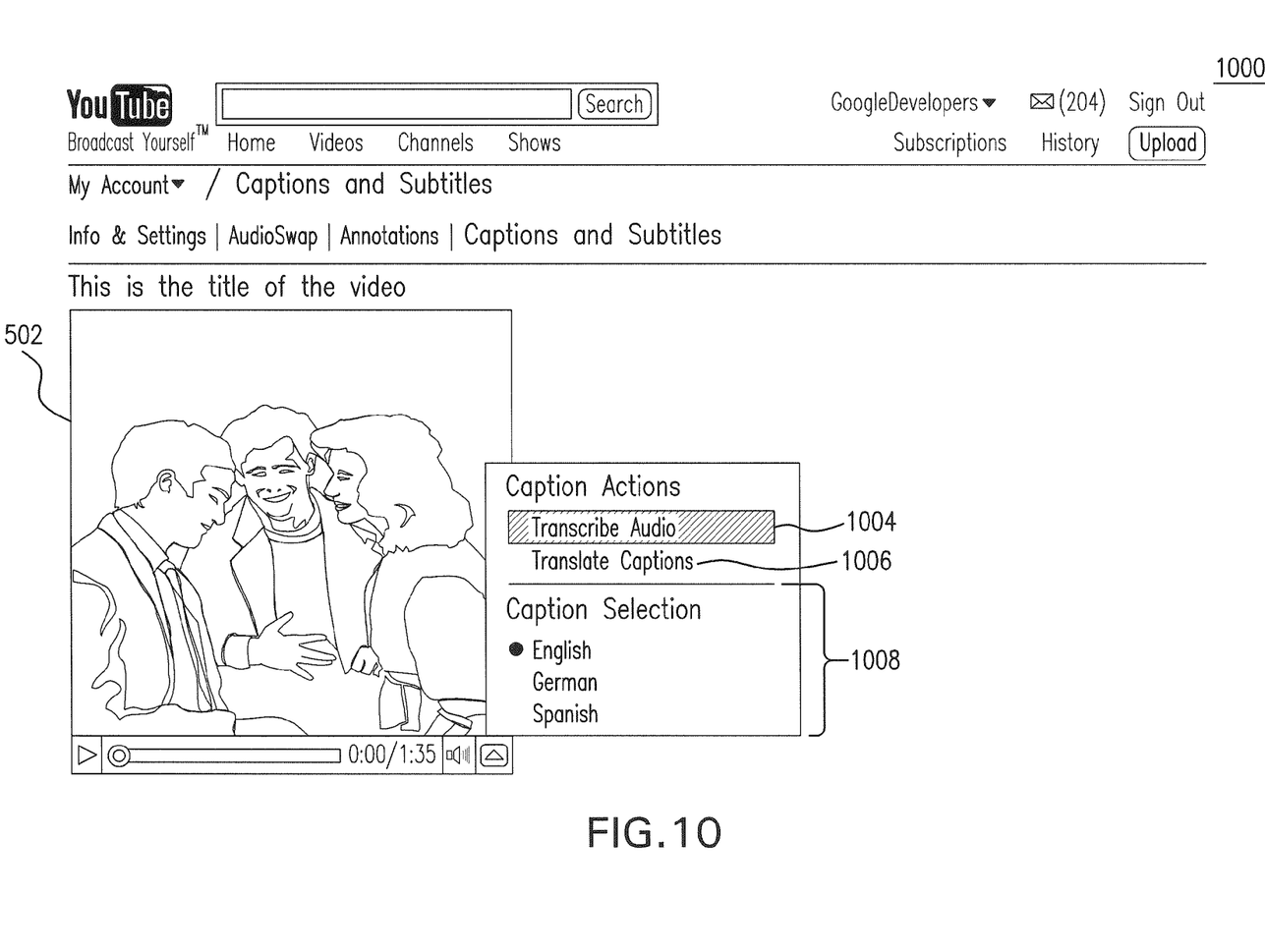

Player module 154 enables a user to play a video and a corresponding timed text track. In one embodiment, player module 154 may be instantiated by a browser plug-in using a FLASH file. Player module 154 may stream video over the Internet to display to a user. Player module 154 may also include various controls, for example, conventional video controls as well as other timed text controls to view a timed text track. The timed text controls may list which timed text tracks are available. The timed text controls may also indicate whether an automated speech recognition track is available (e.g. whether the intermediate data to generate an automated transcription is available). In an example, timed text controls may include an indication that the track is automatically generated and may be of lower quality than manually generated tracks. A screenshot of an example player module 154 is illustrated in FIG. 10.

To generate the timed text controls, player module 154 may request a tracklist from timed text server 110. Timed text server 110 may return the tracklist in, for example, XML format. The XML tracklist may include an attribute to indicate whether a timed text track is automatically or manually generated.

In an embodiment, player module 154 may enable a user to request an automatically generated timed text track. In another embodiment, player module 154 may be configured always to request timed text. In that embodiment, player module 154 may request an automatically generated timed text track if no manually generated timed text tracks are available. To request timed text generated using an automated algorithm, player module 154 may send an HTTP request with a special parameter to timed text server 110.

Timed text server 110 includes a timed text player module 214 that receives the request from player module 154. Timed text player module 214 may retrieve the intermediate data from timed text database 102. Timed text generator module 112 then uses the intermediate data to determine a text transcription for the video. In an embodiment, timed text generator module 112 may use only the intermediate data to determine a text transcription for the video. In an alternative embodiment, timed text generator module 112 may use both the intermediate data and the audio of the video.

Timed text generator module 112 may generate a list of words timestamped at specific times in the video. Then, the words may be combined such that a group of words are displayed during a given time period. To determine the words, timed text generator module 112 may use the intermediate data determined prior to the request. The intermediate data may enable timed text generator module 112 to generate the text transcription more quickly. Using the intermediate data, timed text generator module 112 generates a timed text track describing the speech of the video. The timed text track may define a series of groups of words with each group of words having a corresponding period of time to be displayed in the video.

Once timed text generator module 112 generates the timed text track, timed text generator module 112 sends the timed track to timed text player module 214 in timed text server 110. Timed text player module 214 then sends the timed text track to player module 154 for display with the video. In another embodiment, the timed text track may be sent to player module 154 in band with the video. For example, video server 130 may request text from timed text server 110 and combine the text with the video stream that it sends to client device 140.

In some cases, a transcript may be available for a video. But, the transcript may not have time codes to indicate when to display the text in the video. In an embodiment, timed text editor module 152 may enable a user to upload a transcript, and speech recognition server 120 may include a transcript alignment module 226 that determines when different portions of the transcript should be displayed in the video.

Transcript alignment module 226 may determine time codes corresponding to different portions of the transcript text. The time codes define when to display the text in the video and correspond to when the text is spoken in the audio track. When transcript alignment module 226 aligns the text with the video, transcript alignment module 226 may evaluate the quality of the transcript. If the transcript quality is good, the resulting transcript may be saved in timed text database 102 to be played with the video. If the transcript quality is poor, then the resulting transcript may not be available to be played with the video. Alternatively, transcript alignment module 226 may evenly distribute the transcript text over the duration of the video.

Each of timed text server 110, speech recognition server 120, video server 130, and client computing device 140 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of timed text database 102 and video database 104 may be any type of structured memory, including a persistent memory. In examples, each database may be implemented as a relational database.

Each of timed text player module 214, timed text generator module 112, preprocessor module 122, text generator module 224, transcript alignment module 226, video uploader module 132, browser 150, player module 154, and timed text editor module 152 may be implemented in hardware, software, firmware or any combination thereof.

Timed text server 160 may include a web server. A web server is a software component that responds to a hypertext transfer protocol (HTTP) request with an HTTP response. As illustrative examples, the web server may be, without limitation, Apache HTTP Server, Apache Tomcat, MICROSOFT® Internet Information Server, JBoss Application Server, WEBLOGIC Application Server®, or SUN Java™ System Web Server. The web server may serve content such as hypertext markup language (HTML), extendable markup language (XML), documents, videos, images, multimedia features, MACROMEDIA Flash programs, or any combination thereof. These examples are strictly illustrative and do not limit the present invention.

Method

Figure 3:
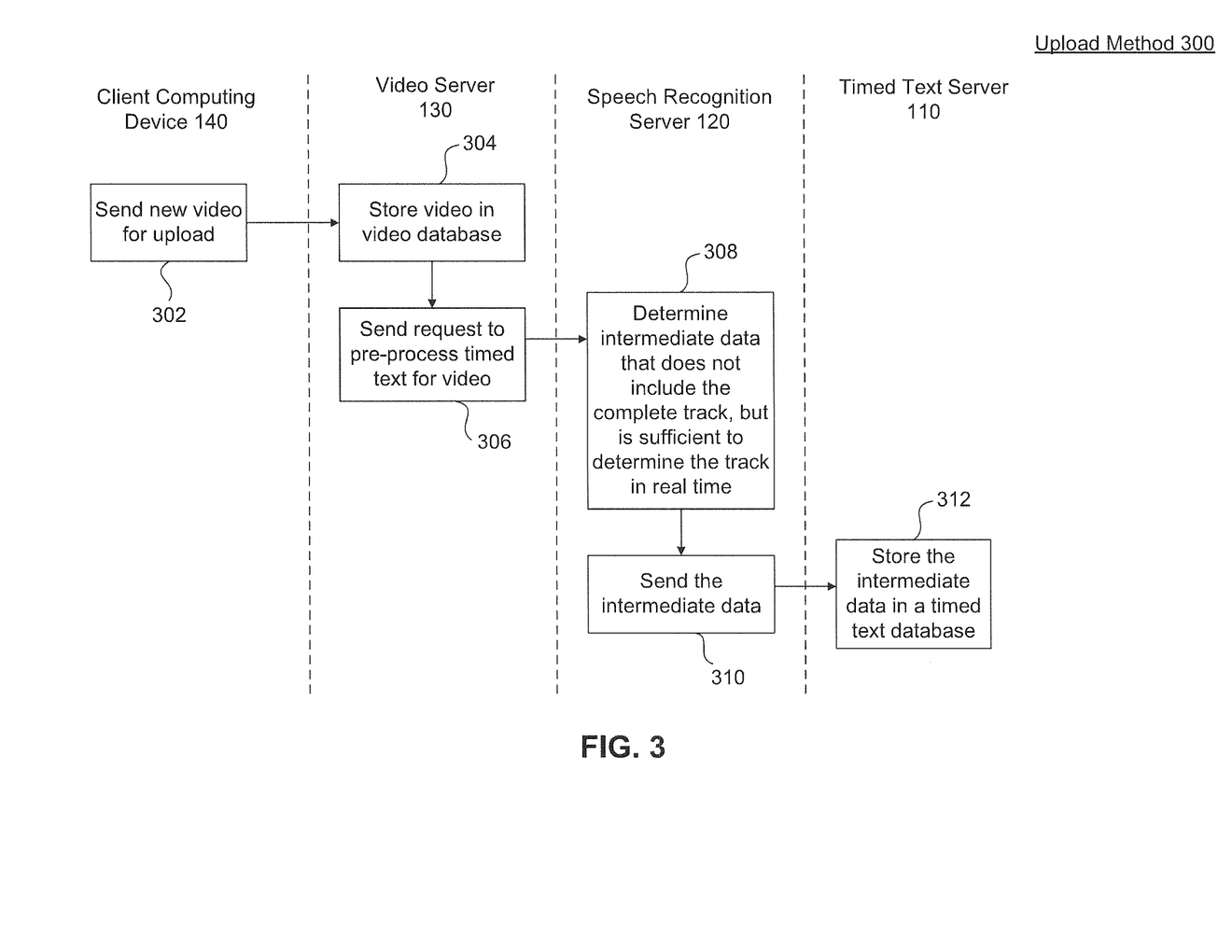
FIG. 3 is a flowchart illustrating a method for uploading web video according to an embodiment.

FIG. 3 is a flowchart illustrating a method 300 for uploading a web video according to an embodiment. Method 300 may be used in operation of system 100 in FIGS. 1-2. For clarity, method 300 is described with respect to components of system 100, but it is not limited thereto. A person of skill in the art given this description would recognize additional applications of method 300.

Method 300 begins with client computing device 140 sending a new video to video server 130 at step 302. At step 304, video server 130 stores the new video in a video database. Then, video server 130 sends a request to speech recognition server 120 to pre-process timed text for the new video at step 306.

In response to the request from video server 130, speech recognition server 120 determines intermediate timed text data for the video at step 308. The intermediate data may not include any transcribed text or complete transcribed text, but may include sufficient data to transcribe the text in real time when playing the video. At step 310, speech recognition server 120 may send the intermediate data to timed text server 110 at step 310. At step 312, timed text server 110 stores the intermediate data in timed text database 102.

Figure 4:
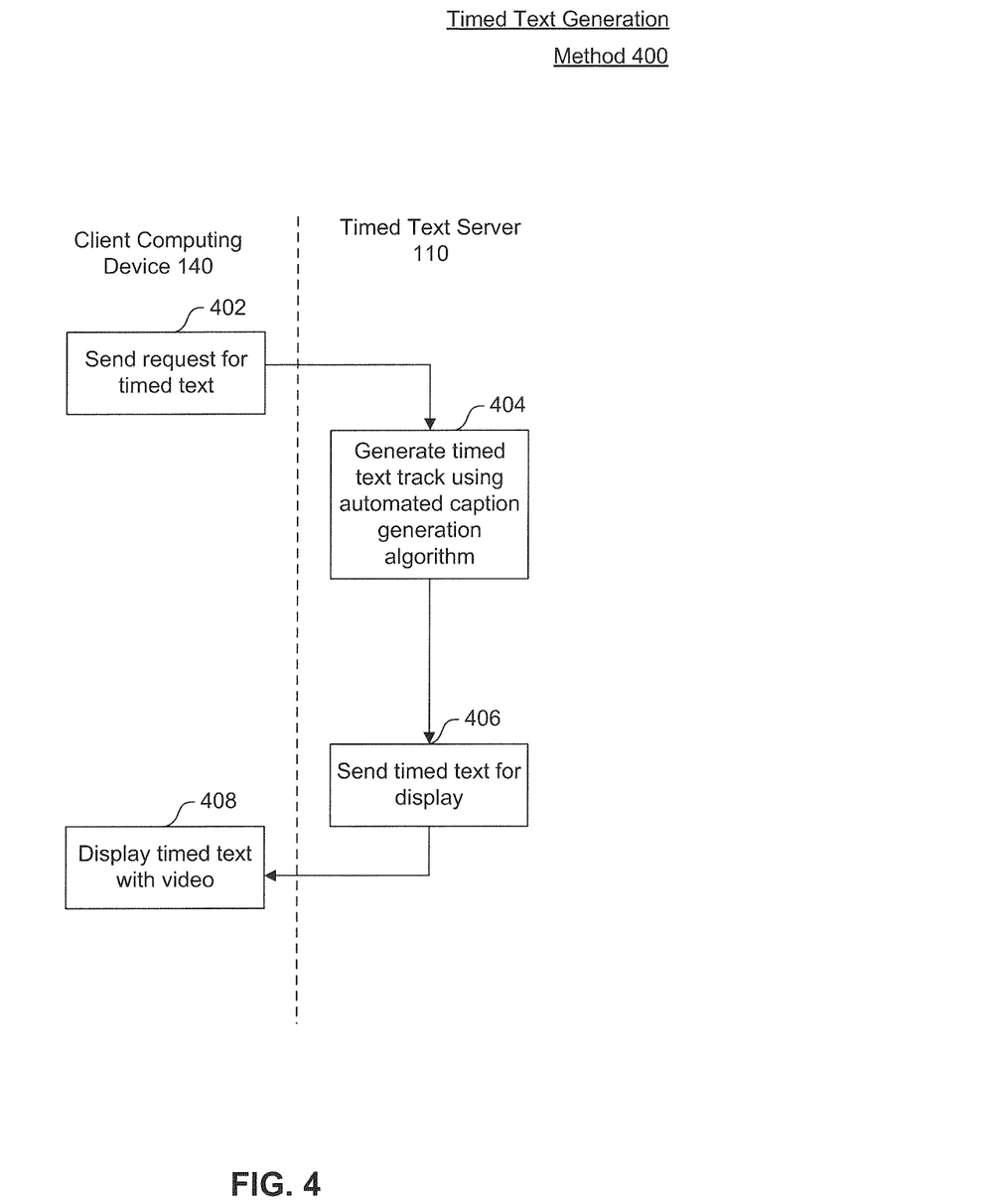
FIG. 4 is a flowchart illustrating a method for generating timed text for web video according to an embodiment.

FIG. 4 is a flowchart illustrating a method 400 for generating timed text for web video according to an embodiment. Method 400 may be used in operation of system 100 in FIGS. 1-2. For clarity, method 400 is described with respect to components of system 100, but it is not limited thereto. A person of skill in the art given this description would recognize additional applications of method 400.

Method 400 begins with client computing device 140 requesting an automatically generated timed text track to timed text server 110 at step 402. At step 404, timed text server 110 retrieves intermediate timed text data corresponding to the video and uses a speech recognition algorithm to generate a timed text track based on the intermediate data received the timed text server 110 at step 406. Any suitable speech recognition algorithm can be used depending upon a particular application or design need. The timed text track may define a series of groups of word with each group of words having a corresponding period of time to be displayed in the video. Speech recognition server 120 sends the timed text track to timed text server 110.

At step 406, timed text server 110 sends the timed text track onto client computing device 140. Client computing device 140 displays the timed text track to a user along with the video at step 408.

Example User Interface

Figure 5:
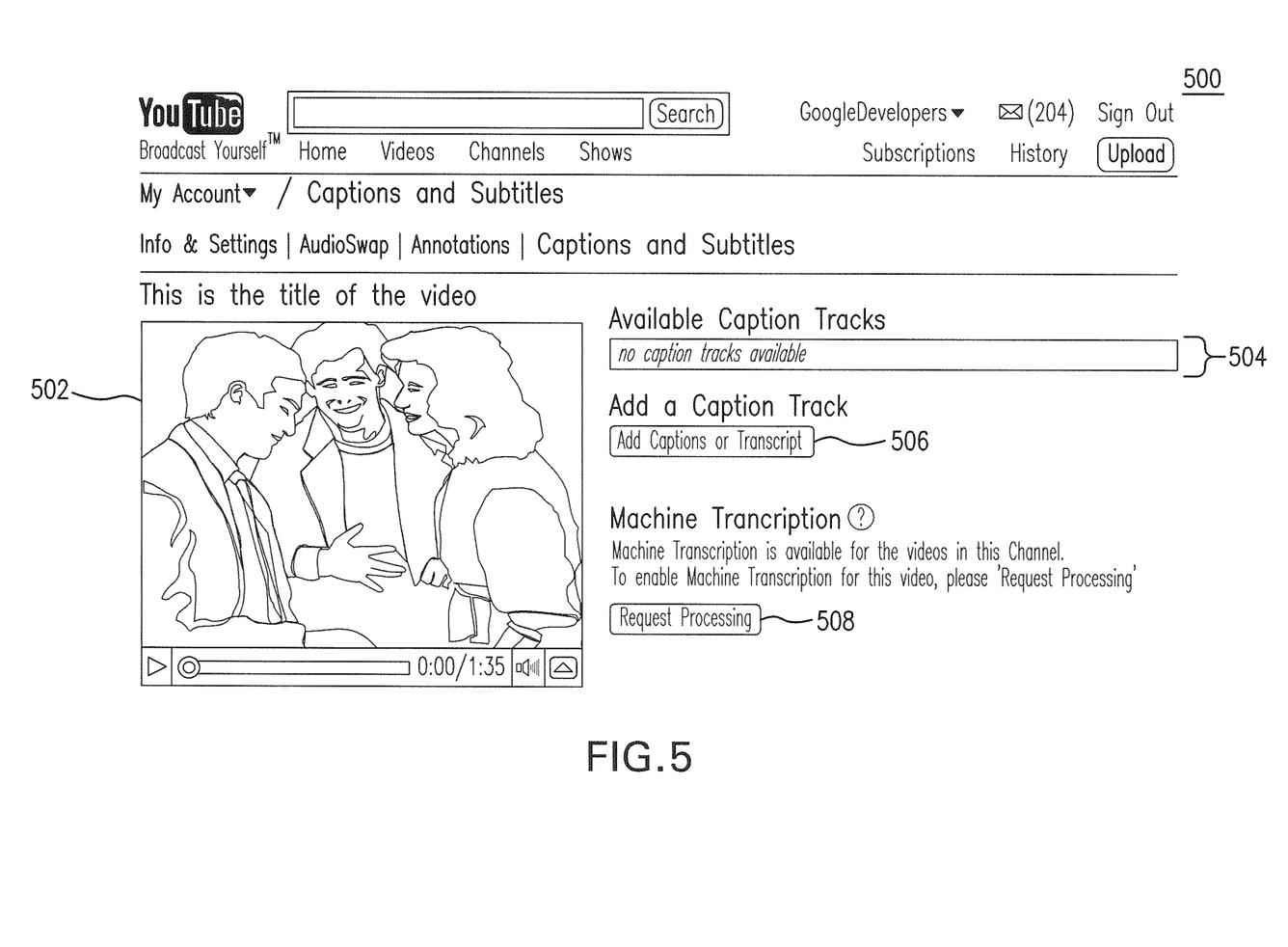
FIGS. 5-10 are diagrams illustrating an example user interface that may be used in the system of FIG. 1.
Figure 6:
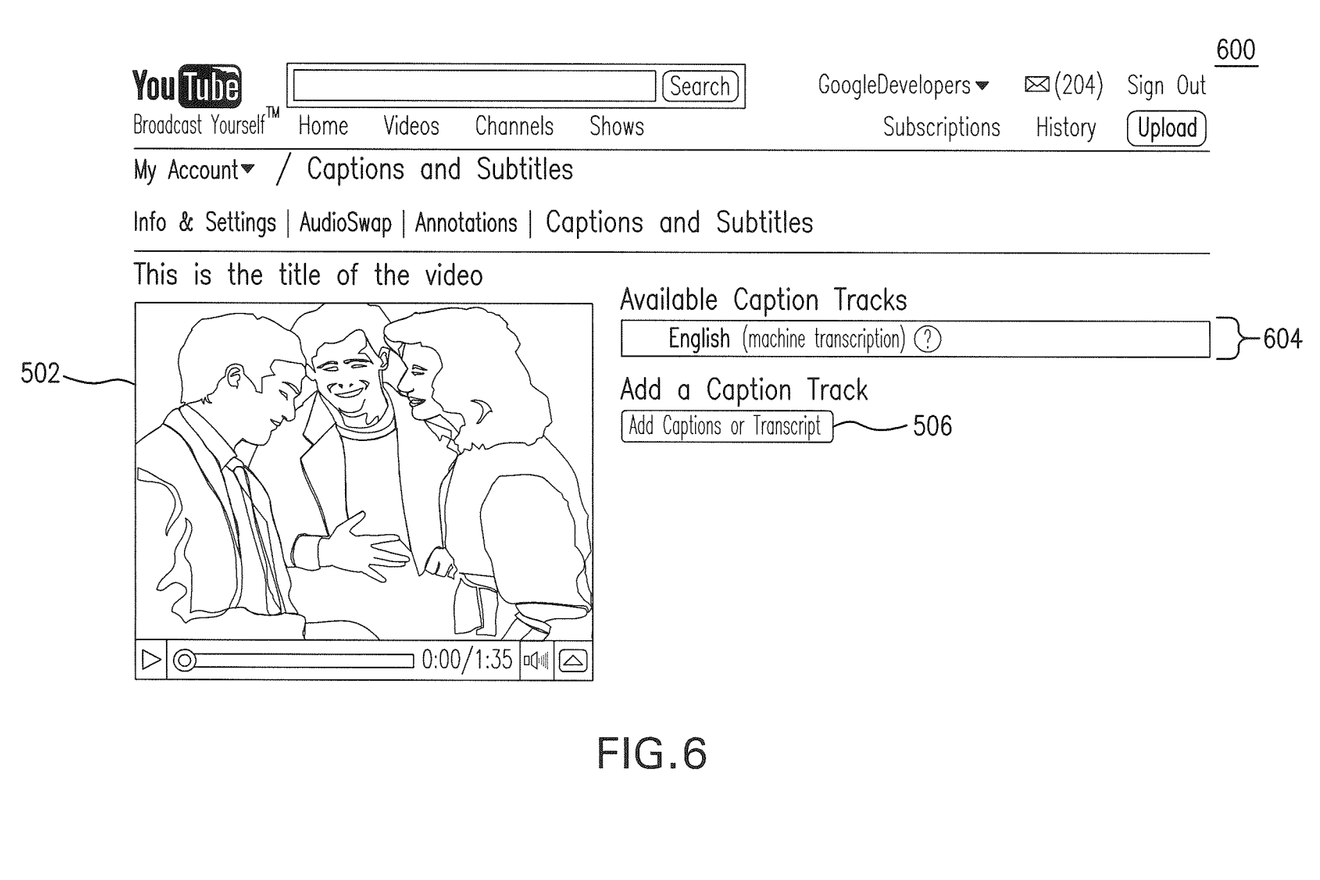

FIGS. 5-10 are diagrams illustrating an example user interface that may be used in the system of FIG. 1. In one example, these user interfaces and accompanying display screens may be implemented using browser 150 on client computing device 140 or on any other remote client device with a browser. FIG. 5 shows a screenshot 500 of an example user interface to manage a video with no timed text tracks. Screenshot 500 shows a video 502 in a video player. A frame 504 indicates that no timed text tracks are presently available for video 502. A button 506, when pressed, navigates a user to an interface to add a manually generated timed text track or known transcript. The interface to add a manually generated timed text track or known transcript is described in more detail below with respect to FIG. 9. Screenshot 500 also includes a button 508 that, when pressed, requests that timed text data (either intermediate data or a complete timed text transcription) be generated. When pressed, button 508 also navigates a user to an interface as illustrated in FIG. 6.

FIG. 6 shows a screenshot 600 of an example user interface to manage a video with an automatically generated timed text track shown at frame 604. In an embodiment, frame 604 may appear when intermediate data has been generated to enable speech-to-text transcription in real-time when the video is played. In another embodiment, frame 604 may appear when a complete text transcription has been generated.

Figure 7:
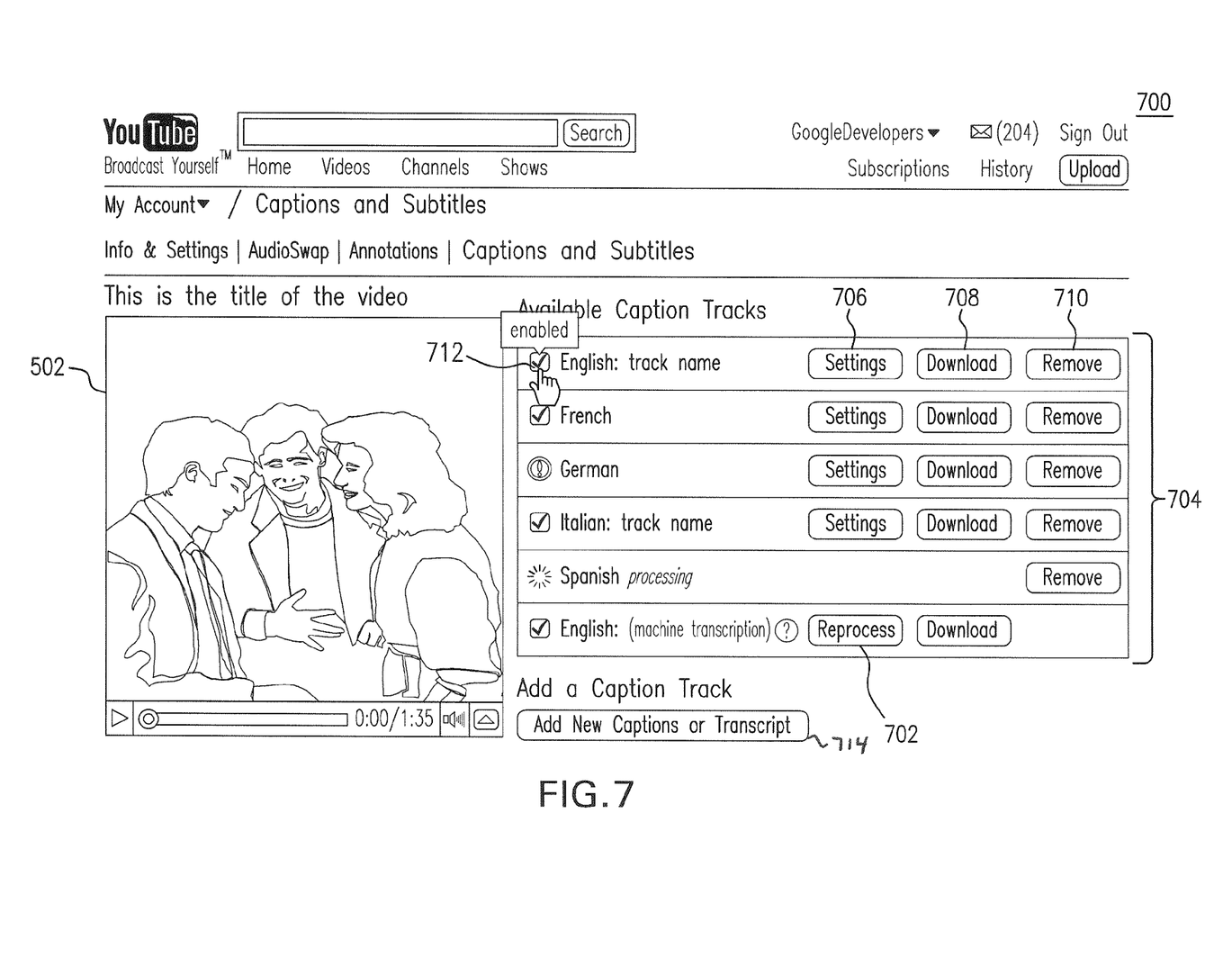

FIG. 7 shows a screenshot 700 of an example user interface to manage a video with multiple timed text tracks. Frame 704 shows a listing of multiple timed text tracks. Each listed manually generated timed text track includes an checkbox to enable display of the track to users (such as a checkbox 712), a button to navigate to an interface to adjust settings for the track (such as a button 706), a button to download the track (such as a button 708), and a button to remove the track (such as a button 710). Each listed timed text track generated with an automated speech to text algorithm may include a button to reprocess the video (such as a button 702). Reprocessing the video may include re-generating the timed text track or the intermediate data. Enabling the user to reprocess this data may be useful as speech-to-text algorithms improve in accuracy. Screenshot 700 further includes an "Add Caption" button 714. When selected, button 714 may navigate a user to an interface to upload a caption as illustrated in FIG. 9. Selecting a listed timed text track may result in displaying the track as shown in FIG. 8.

Figure 8:
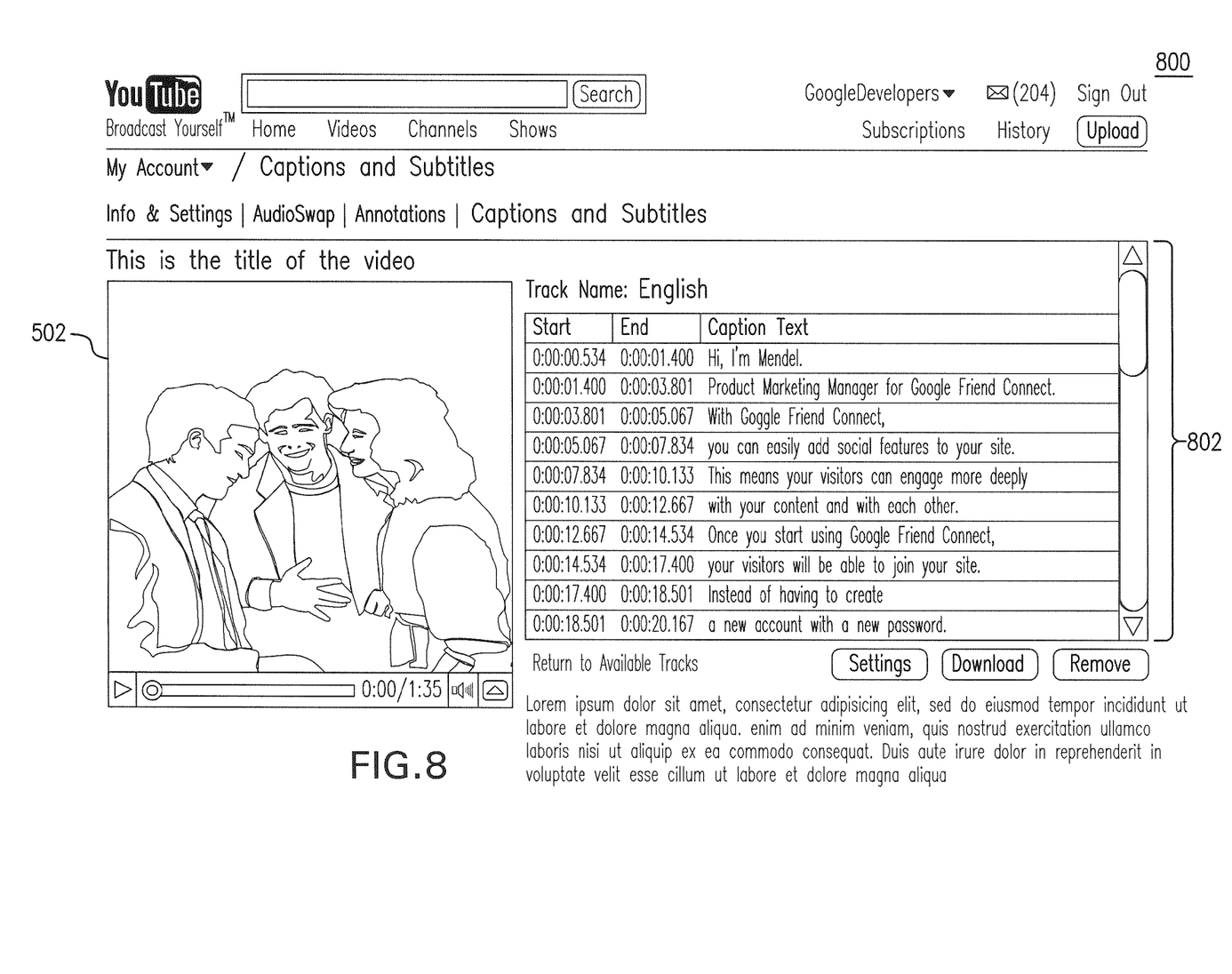
Figure 9:
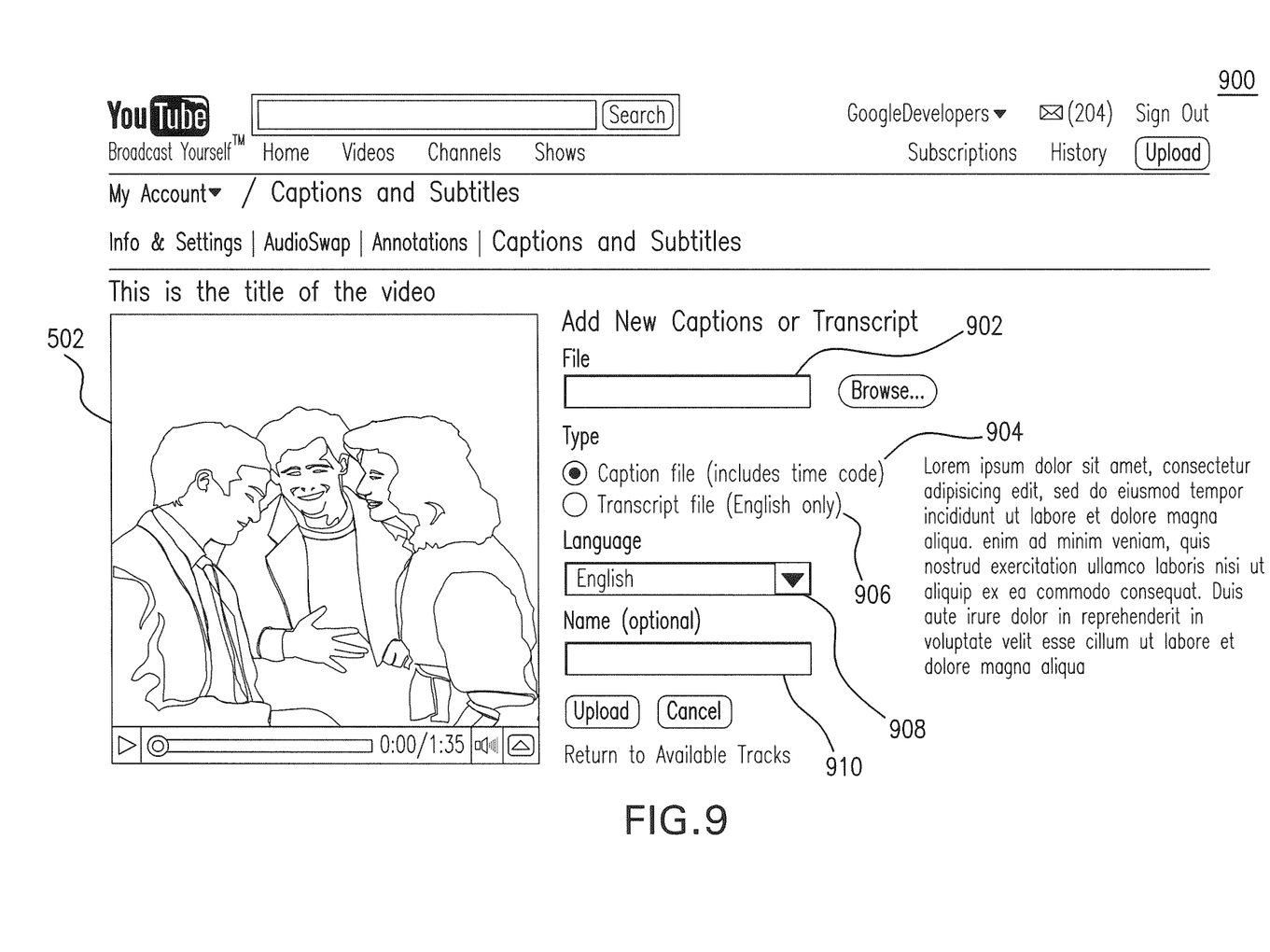

FIG. 8 shows a screenshot 800 of an example user interface to display a timed text track. Frame 802 lists caption text in one column and the times to begin and end display of the caption text in another column. Navigation controls such as a slider may also be provided to scroll through the timed text track.

FIG. 9 shows a screenshot 900 of an example user interface to add a manually generated timed text track or known transcript. A field 902 enables a user to specify a file with the manually generated timed text track or known transcript. The file may, for example, be a comma-delimited text file. Radio boxes 904 and 906 indicate whether the file is a manually generated timed text track or known transcript. A drop down menu 908 enables a user to select a language of the manually generated timed text track or known transcript. Finally, field 910 enables a user to name the timed text track. When a user uploads a known transcript, time codes for the known transcript may be determined as described above with respect to transcript alignment module 226. As described above, transcript alignment module 226 may determine time codes corresponding to different portions of the transcript text. The time codes define when to display the text in the video and correspond to when the text is spoken in the audio track.

FIG. 10 shows a screenshot 1000 of an example user interface with a menu to play a timed text track. A menu option 1004 enables a user to request a timed text track that is automatically generated with an algorithm. A menu option 1006 enables a user to request a timed text track translated into another language. Finally, menu options 1008 enable a user to select a language of the requested timed text track.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for generating timed text for online video, comprising:
   receiving, from a client computing device, a request to play a timed text track of a video incorporated into an online video service;
   prior to receipt of the request, processing audio of the video to determine intermediate timed text data, the intermediate timed text data lacking a complete text transcription of the audio, but comprising data to enable the complete text transcription to be generated when playing the video;
   in response to the receipt of the request, determining a text transcription of the audio using the intermediate data; and
   sending the text transcription of the audio to the client computing device for display along with the video.

2. The method of claim 1, wherein the processing comprises determining the intermediate data, the intermediate data lacking any text transcription of the audio.

3. The method of claim 2, wherein the processing further comprises determining a plurality of segments, each segment corresponding to a time period in the audio, wherein the intermediate data comprises the plurality of segments.

4. The method of claim 3, wherein the respective segments in the plurality of segments specify a type of sound played during the corresponding time period in the audio.

5. The method of claim 1, wherein the intermediate timed text data comprises data to enable the complete text transcription to be generated in real time video when playing the video,
   wherein the determining comprises determining the text transcription of the audio in real time with the audio, and
   wherein the sending comprises sending the text transcription in real time to display along with the video.

6. The method of claim 1, further comprising:
   providing an interface to enable a user to select one of a plurality of transcriptions to play, wherein the plurality of transcriptions comprises a user-generated transcription and an automatically generated transcription,
   wherein the receiving comprises receiving a request indicating that the user selected to play the automatically generated transcription.

7. The method of claim 1, further comprising:
   receiving the video to incorporate into the online video service,
   wherein the processing occurs in response to receipt of the video.

8. A system for generating timed text for online video, comprising:
   a processor;
   a timed text player module executable by the processor to receive, from a client computing device, a request to play a video incorporated into an online video service;
   a preprocessor module that, prior to receipt of the request by the timed text player, processes audio of the video to determine intermediate timed text data, the intermediate timed text data lacking a complete text transcription to be generated when playing the video; and
   a text generator module that, in response to the request by the timed text player, determines a text transcription of the audio using the intermediate data,
   wherein the timed text player module sends the text transcription of the audio to the client computing device for display along with the video.

9. The system of claim 8, wherein the intermediate data lacks any text transcription of the audio.

10. The system of claim 8, wherein the intermediate data comprises a plurality of segments, each segment corresponding to a time period in the audio.

11. The system of claim 10, wherein the respective segments in the plurality of segments specify a type of sound played during the corresponding time period in the audio.

12. The system of claim 8, where in the intermediate timed text data comprises data to enable the complete text transcription to be generated in real time when playing the video,
    wherein the text generator module determines the text transcription of the audio in real time with the audio, and
    wherein the timed text player module sends the text transcription in real time to display along with the video.

13. The system of claim 8, wherein the timed text player module provides an interface to enable a user to select one of a plurality of transcriptions to play,
    wherein the plurality of transcriptions comprises a user-generated transcription and an automatically generated transcription; and
    wherein the request indicates that the user selected to play the automatically generated transcription.

14. The system of claim 8, further comprising:
    a video uploader module that receives the video to incorporate into the online video service,
    wherein the preprocessor module processes the audio in response to receipt of the video by the video uploader module.

15. The system of claim 8, further comprising:
    a timed text server, implemented on a first computing device, that comprises the timed text player module, and
    a speech recognition server, implemented on a second computing device separate from the first computing device, that comprises the preprocessor module, the speech recognition server coupled to the timed text server via one or more networks.

16. The system of claim 8, further comprising:
    a memory, coupled to the processor that stores the timed text player, the preprocessor module, and the text generator.

17. A computer-implemented method for generating timed text for online video, comprising:
    receiving a transcript, input by a user, for a video to incorporate into an online video service;
    determining a quality value of the transcript of the video, the quality value representing how closely the transcript specifies audio for the video;

when the transcript is of sufficient quality for alignment, determining time codes indicating when to display respective portions of the transcript to align the transcript with the audio of the video; and providing the time codes to a client computing device to display the transcript along with the video.

18. The method of claim 17, further comprising:

when the transcript is of insufficient quality for alignment, determining time codes indicating when to display respective portions of the transcript to evenly distribute the transcript text over the duration of the video.

19. A system for generating timed text for online video, comprising:

a processor;

a timed text module, executable by the processor to enable a user to input a transcript for a video to incorporate into an online video service;

a transcript alignment module that determines a quality value of the transcript of the video, the quality value representing how closely the transcript specifies audio for the video and, when the transcript is of sufficient quality, determines time codes indicating when to display respective portions of the transcript to align the transcript with the audio of the video using an automated speech-to-text algorithm; and a timed text player module that provides the time codes determined by the transcript alignment module to a client computing device to display the transcript along with the video.

20. The system of claim 19, wherein the transcript alignment module, when the transcript is of insufficient quality of alignment, determines time codes indicating when to display respective portions of the transcript to evenly distribute the transcript text over the duration of the video.

* * * * *